May 17, 1949.　　　　K. Y. MESSICK　　　　2,470,360
LUMBER LOADING TRUCK
Filed May 28, 1946　　　　　　　　　　3 Sheets-Sheet 1
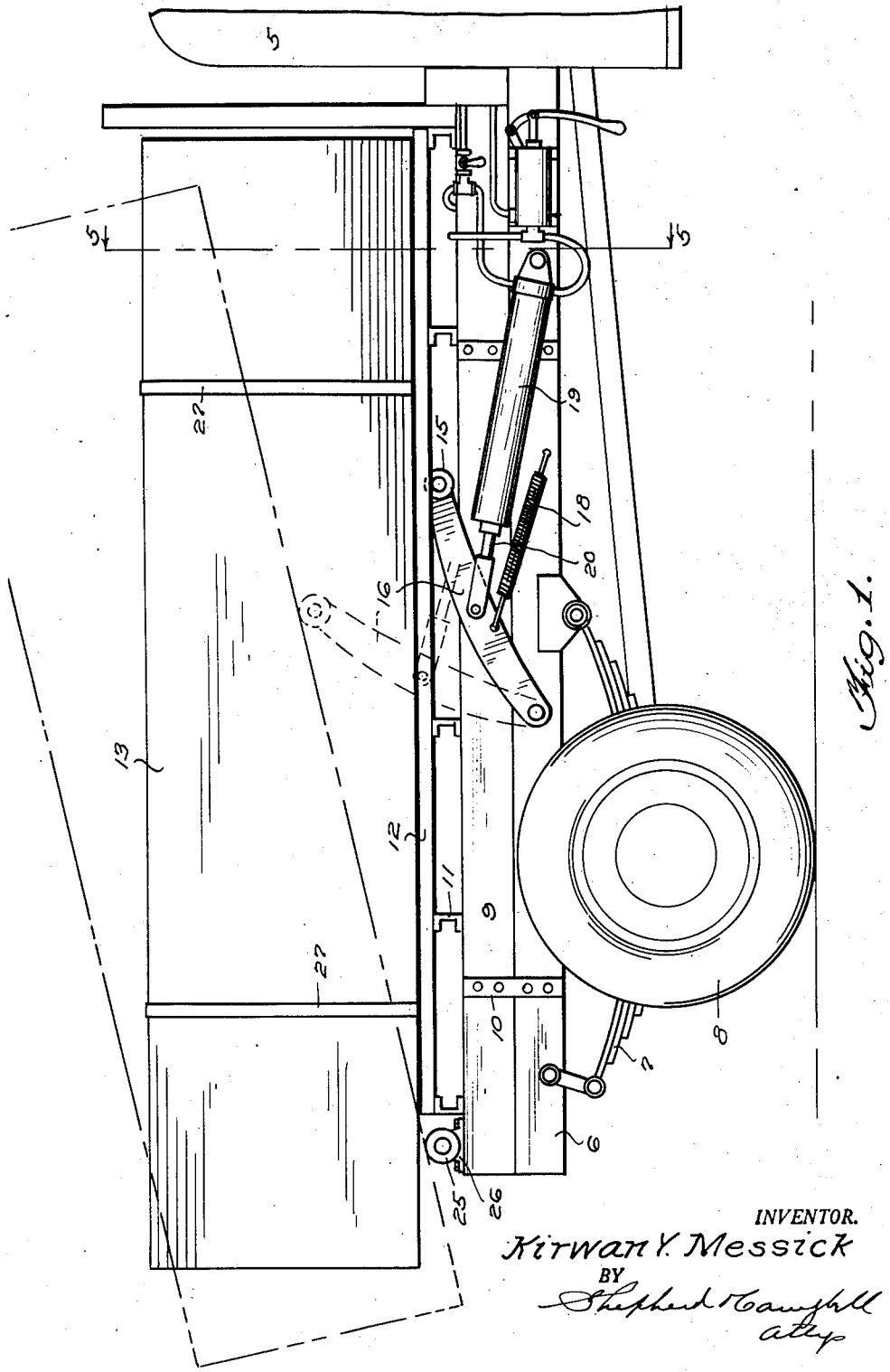
INVENTOR.
Kirwan Y. Messick
BY
Shepherd Campbell
Atty May 17, 1949.  K. Y. MESSICK  2,470,360
LUMBER LOADING TRUCK
Filed May 28, 1946  3 Sheets-Sheet 2
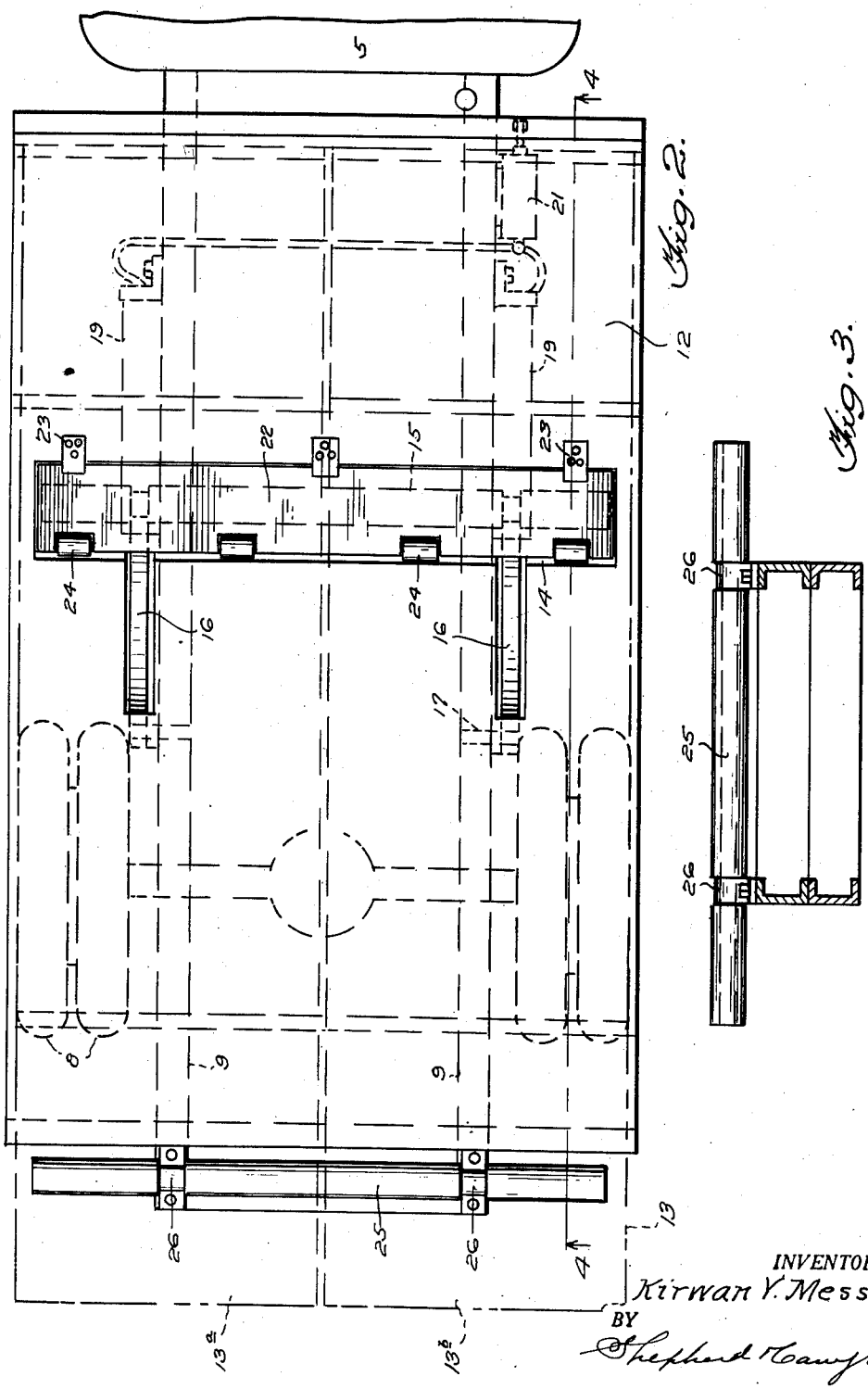
INVENTOR.
Kirwan Y. Messick
BY
Shepherd Caughill May 17, 1949.   K. Y. MESSICK   2,470,360
LUMBER LOADING TRUCK
Filed May 28, 1946   3 Sheets-Sheet 3
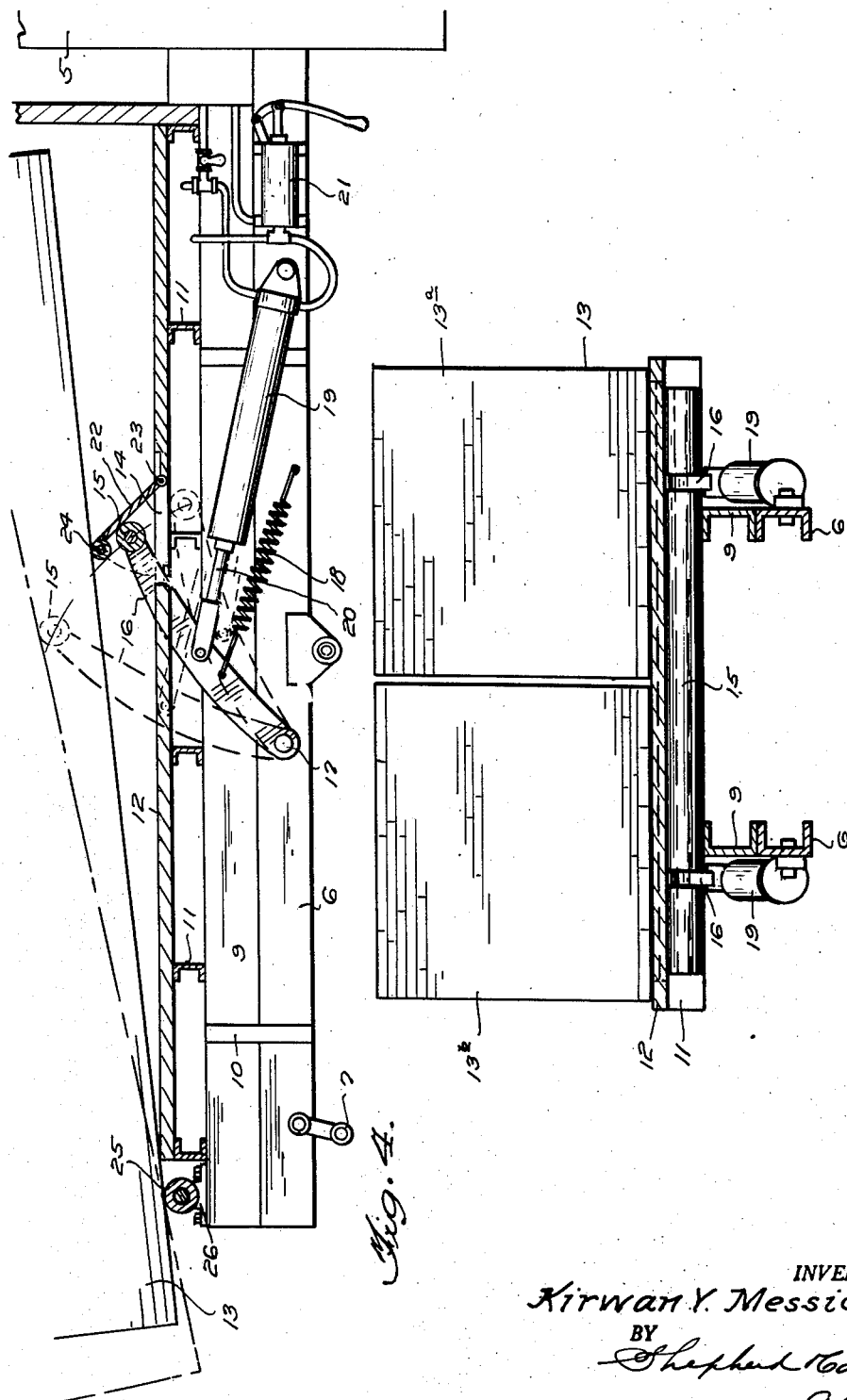
INVENTOR.
Kirwan Y. Messick
BY
Shepherd Campbell
Attys.

Patented May 17, 1949

2,470,360

UNITED STATES PATENT OFFICE 2,470,360

LUMBER LOADING TRUCK

Kirwan Y. Messick, Arlington, Va.

Application May 28, 1946, Serial No. 672,821

6 Claims. (Cl. 214—84)

This invention relates to lumber trucks and it has for its object to provide a truck so constructed as to facilitate the loading of lumber thereon by power means and to facilitate the unloading of lumber therefrom, partly by power means and partly by gravity. Broadly stated, the invention resides in providing a truck with a roller at its rear end, and an additional roller at an advanced point upon the truck adapted, when it is elevated, to lift the load of lumber until the lumber rests upon both rollers and may roll rearwardly from the truck.

I am aware of the fact that vehicles have heretofore been proposed having rolling elements as part of the floors upon which the load rested. In such vehicles the load travelled to its point of destination supported upon the rollers and held against dislodgement from the vehicles by chains or other fastening devices. However, many serious accidents have occurred due to the failure of the fastening devices with the result that the load, such as a load of lumber, for example, would be discharged in a tangled mass upon the highway, and into the path of other vehicles. These accidents resulted in a number of States enacting laws to prohibit material from being transported over the public highway while being supported upon vehicles having rolling devices as supports for the load. It is therefore a primary object of the present invention to provide a truck, the supporting surfaces of which, during the transportation of the load, present no rolling elements whatever but which truck is provided with rolling elements which normally lie below the level of the bottom of the load of lumber and which may be engaged with the lumber when the destination is reached in such manner that the lumber will be supported upon rolling surfaces at at least two points in its length and may be brought to such degree of inclination as to cause it to roll from the truck as hereinafter described.

It is a further object of the invention to utilize the elevating means of the load as a means for holding the load spaced far enough from the floor of the truck during the loading of the lumber thereon to permit the arms of a conventional travelling elevator to be withdrawn after having deposited a load of lumber upon the truck.

Further objects and advantages of the invention will be understood by reference to the accompanying drawings wherein:

Figure 1 is a side elevation of a portion of a lumber truck constructed in accordance with the invention.

Figure 2 is a plan view.

Figure 3 is a view of the rear end roller, hereinafter described.

Figure 4 is a side elevation of the truck chassis and associated parts with the floor and certain other parts in section; and Figure 5 is a transverse sectional view illustrating the mounting of the hydraulic cylinders hereinafter described.

Like numerals designate corresponding parts throughout the several figures of the drawings.

In the drawings, 5 designates a truck cab, 6 the chassis, 7 the springs and 8 the rear wheels. These elements are those which are commonly delivered by the manufacturer when a truck chassis alone is purchased. I utilize such a conventional truck chassis and running gear by mounting thereon a pair of, preferably channel iron, sills 9, which may be tied to the chassis 6 by straps 10, or secured in any other way. Transverse beams 11 support a floor 12 upon which the lumber 13 rests when in transit. The floor 12 is interrupted in its length to provide a transverse opening 14. A roller 15 which extends the full width of the truck body is carried by the free ends by a pair of swinging arms 16, there being one of these arms upon each side of the truck and said arms being pivoted at 17 to the chassis 6. Springs 18 tend to draw the arms and the roller 15 downwardly to a position where the top of the roller lies below the floor level and consequently out of contact with the load of lumber. Movement is imparted to the arms to swing them upwardly and rearwardly by a conventional hydraulic cylinder and piston rod, 19 and 20, it being understood that there is one of these cylinders at each side of the truck. Pressure fluid such as oil, is fed to the cylinders 19 by a pipe common to both of them and thus the pressure in the cylinders is equalized.

The pressure of the fluid may be forced into the cylinders in any desired way, as for example, by an engine driven pump. However, in the simplest embodiment of the invention a simple hand pump 21 is employed and by manipulation of this pump the truck driver may elevate the roller 15. The opening 14 may, if desired, be spanned by a shield or heavy metal plate 22, hinged at one edge 23 and provided at its other edge with a roller 24. This shield or plate may or may not be employed. When used it is used merely for the purpose of permitting the truck to be used to haul small objects other than lumber and which objects might otherwise fall through the opening 14. When it is used the rise of the roller 15 thrusts plate 22 upwardly and this in turn elevates the forward end of the load of lumber. The raising of the load is continued until the rear portion of the load contacts and rests upon a roller 25 that is supported in fixed bearings 26 upon the rear ends of the sills 9. The top of roller 25 lies slightly below the floor level and the top of the roller 15 also lies below the floor level when the load is in transit. Consequently at this time the load of lumber has full frictional engagement with the floor over its entire area and there is no danger that the lumber will be dislodged from the truck. The lumber is preferably loaded upon the truck in preformed stacks. That is to say, it is bound together by metallic straps 27, such as is commonly employed for binding heavy crates and the like and I prefer to make these stacks of such size that two or more of them, designated 13a and 13b, may be disposed in the width of the truck. Thus, in loading the truck it is necessary for the travelling elevator to handle only one-half of the load at a time. The travelling elevator, not shown, is a device in common use, comprising a wheeled, power driven body, carrying substantially horizontal arms and means for elevating the arms with respect to the wheeled body, so that the arms may be first lowered to engage beneath a heavy object and thereafter elevated to deposit such heavy object in a desired elevated position. When utilizing such a wheeled elevator to load the truck of the present invention, the roller 15 may be raised high enough to permit the arms of the loading elevator to pass transversely across the truck body in placing the load thereon, the withdrawal of the arms of the loading elevator leaving the lumber resting upon the roller 15 and the rear portion of the floor of the truck. After the lumber has been placed the roller 15 is lowered and then the load rests upon the floor of the truck over its whole area, no part of the load being engaged with a rolling surface.

By virtue of the arrangement shown and described, I am able to load a lumber truck by power means and to discharge the lumber from the truck by power means. Thus a single man, to wit, the driver of the truck, may not only convey the lumber to its destination, but may unload the truck in a few minutes time without assistance from anyone else.

While I have described the means for lifting the forward portion of the load of lumber as comprising swinging arms to which the hydraulic cylinders and pistons are attached, I wish it to be understood that the invention could be carried out by disposing the cylinders 19 vertically and having the rollers mounted directly in the ends of the pistons 20. Such an arrangement would impart a direct vertical thrust to roller 15. The pistons and cylinders and the arms 16 constitute what is, in effect, a powerful jack for jacking up the roller 15 and the load of lumber, while leaving the roller free to turn. Therefore, it should be understood that any power multiplying means constituting, in effect, such a jacking up means for the roller 15, is within the scope of the invention.

The invention covers broadly two rollers normally below the floor level and power means the action of which brings about the contacting of both rollers with the lumber load and the tipping of the load beyond the angle of repose.

Many ways will readily suggest themselves to those skilled in the art for varying the means for accomplishing the primary objects of the invention, therefore it is to be understood that the invention is not limited to the precise construction set forth, but that it includes within its purview whatever changes fairly come within either the terms or the spirit of the appended claims.

Having described my invention, what I claim is:

1. The combination with a lumber truck, comprising members constituting a fixed floor shaped and dimensioned to receive a load of lumber with said lumber resting directly thereon and frictionally engaged therewith, of a roller disposed transversely of the truck across the rear portion thereof, and rearwardly of said floor, said roller being mounted in fixed bearings upon the truck and having its upper portion disposed enough below the floor level of the truck that the lumber will not contact said roller until the forward portion of the load of lumber is elevated, a second roller extending transversely of the truck, at a point forward of the center of gravity of the load of lumber thereon and below the level of said floor and power means for bodily elevating the latter roller while maintaining said roller substantially parallel with the first-named roller.

2. A structure as recited in claim 1, wherein the power means comprises hydraulic cylinders and pistons and means for connecting said cylinders and pistons to the truck and to the second-named roller.

3. A structure as recited in claim 1 wherein the power means comprises a pair of vertically swinging arms pivotally engaged with the truck, said arms being located upon opposite sides of said truck and the second-named roller being journalled in the free ends of said arms, hydraulic cylinders and pistons exerting thrust between said arms and a point upon the truck and means for supplying pressure fluid to the hydraulic cylinders.

4. In a lumber handling truck, the combination with a wheeled supporting frame, a lumber receiving floor thereon, a transverse opening formed through said floor, a roller movable from a position where its upper face lies below the floor level, to a position where its upper face lies materially above said floor level, power means for thrusting said roller bodily upward through said opening and a second roller supported upon the framework of the truck at a point beyond the rear end of the floor and at such a level that its upper face lies below the level of the floor, the positioning of said rollers being such that upward movement of the first-named roller through said opening of the floor elevates the forward portion of the load of lumber enough to tip its rear portion downwardly and into contact with the second-named roller, to thereby bring about the rolling discharge of the lumber gravitally from said rollers.

5. A structure as recited in claim 4, wherein the power means for thrusting the first-named roller upwardly comprises a pair of arms, said arms being pivoted at their lower ends for swinging movement with respect to the truck and being provided at their outer ends with bearings for the first-named roller, and hydraulic cylinders and pistons, one upon each side of the truck, thrusting between points upon the frame and points upon said swinging arms, which points lie between the upper and lower ends of said arms.

6. The combination with a lumber truck having a fixed floor upon which the lumber directly rests when in transit, a transverse roller disposed across the rear end of the truck, a second transverse roller extending across the truck forwardly of the fore and aft center of gravity of the load the tops of both of said rollers lying below the floor level when the load is in transit, and power means for bodily elevating the forward roller to an extent to tip the load of lumber beyond the angle of repose, to thereby effect the gravital discharge of the load over the rear roller.

KIRWAN Y. MESSICK.

REFERENCES CITED

The following references are of record in the file of this patent:

UNITED STATES PATENTS

| Number | Name | Date |
|---|---|---|
| 2,156,438 | Suverkrup | May 2, 1939 |
| 2,189,052 | Anthony | Feb. 6, 1940 |
| 2,308,648 | De Vry et al. | Jan. 19, 1943 |

FOREIGN PATENTS

| Number | Country | Date |
|---|---|---|
| 357,256 | Great Britain | Sept. 14, 1931 |